No. 876,034. PATENTED JAN. 7, 1908.
T. P. & W. W. WILSON.
STEERING DEVICE FOR AUTOMOBILES.
APPLICATION FILED MAR. 11, 1907.
2 SHEETS—SHEET 2.
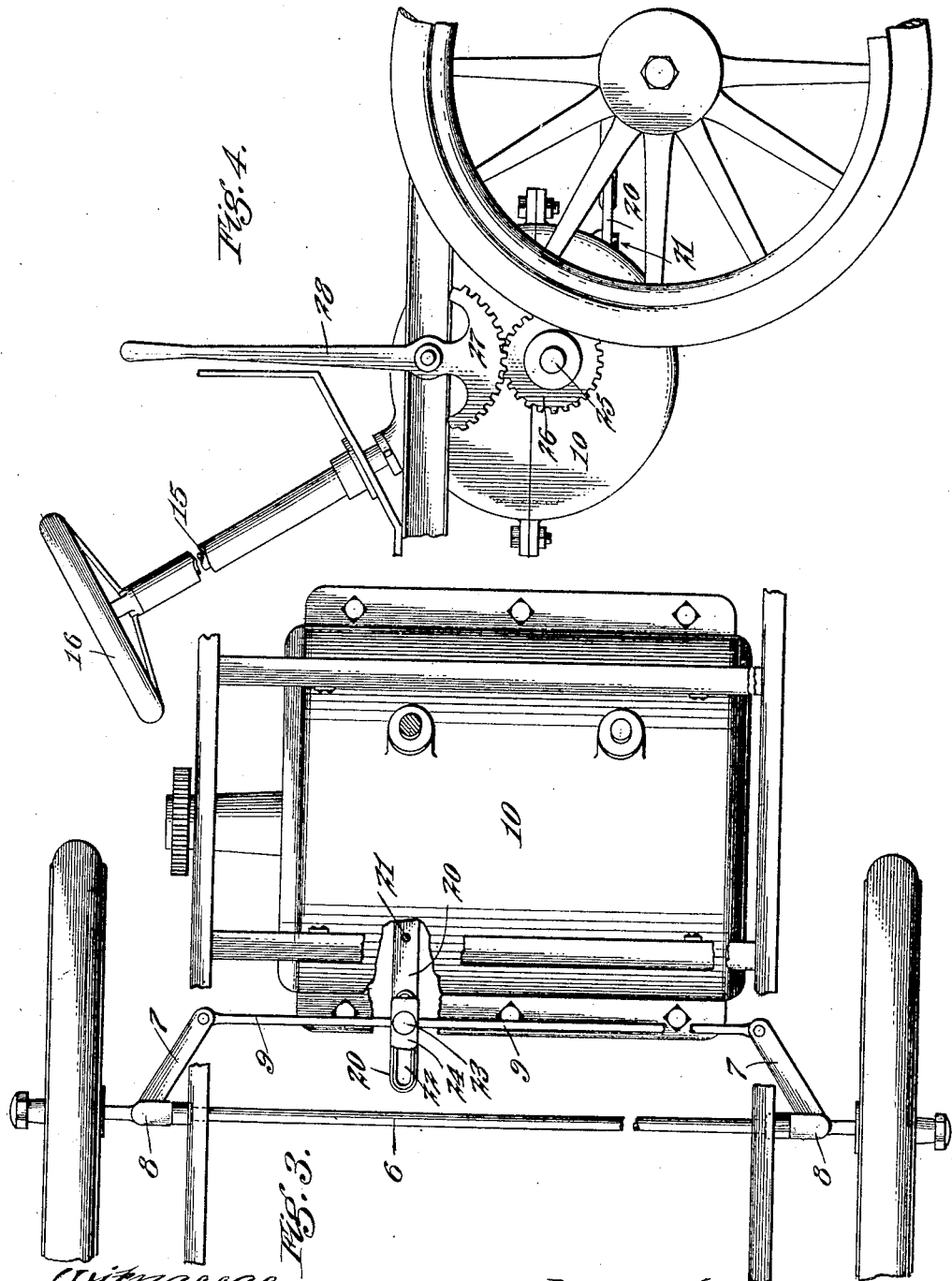

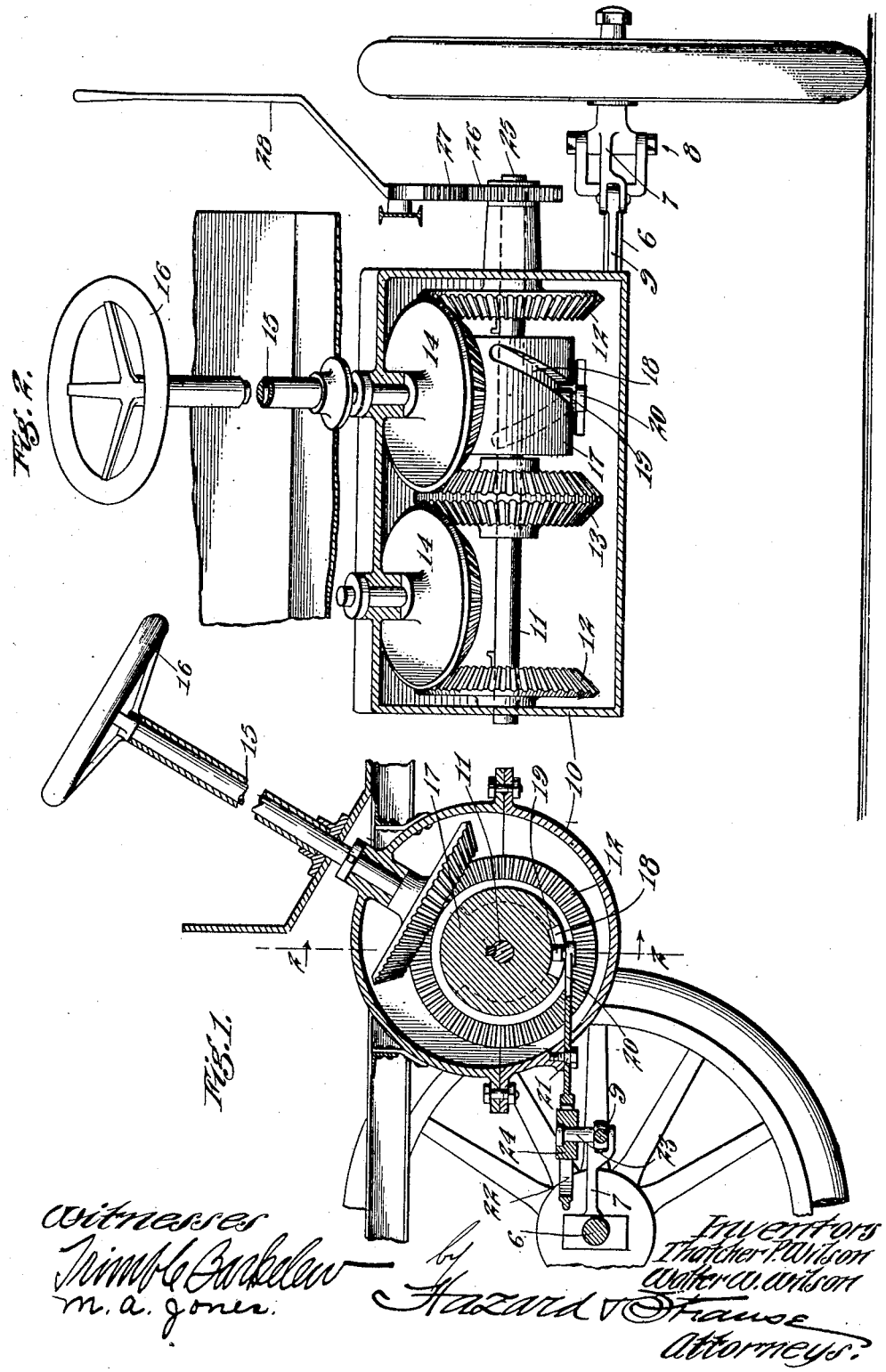

UNITED STATES PATENT OFFICE.

THATCHER P. WILSON AND WALTER W. WILSON, OF LONGBEACH, CALIFORNIA.

STEERING DEVICE FOR AUTOMOBILES.

No. 876,034.  Specification of Letters Patent.  Patented Jan. 7, 1908.

Application filed March 11, 1907. Serial No. 361,642.

*To all whom it may concern:*

Be it known that we, THATCHER P. WILSON and WALTER W. WILSON, both citizens of the United States, residing at Longbeach, in the county of Los Angeles and State of California, have invented new and useful Improvements in Steering Devices for Automobiles, of which the following is a specification.

The object of our invention is to provide a steering gear in which the turning movement is accomplished by means of a slot in the periphery of the rotating cylinder, and to distribute the strain placed on the cylinder in rotating it, to dispense with the usual worm gear and sector, and to reduce the liability of the steering wheel being thrown out of the hands of the driver of the auto. We accomplish these objects by means of the device described herein and illustrated in the accompanying drawings, in which:—

Figure 1— is a view partly in elevation and partly in section of the steering gear of an automobile embodying our invention. Fig. 2— is a view partly in elevation and partly in section taken on line 2—2 of Fig. 1 looking in the direction of the arrow head thereon. Fig. 3— is a fragmentary plan thereof partly broken away. Fig. 4— is a fragmentary elevation of the auxiliary steering device.

In the drawings 6 represents the axle of the automobile and 7 the steering arms pivotally mounted thereon as at 8. The drag link 9 is pivotally secured at each end in the rearwardly projecting ends of the steering arms. Disposed immediately in the rear and slightly above is the gear inclosing cylinder 10. This cylinder is secured to the frame of the car in any suitable manner and carries revolubly mounted therein the gear shaft 11. On each end of this rotary shaft is mounted a bevel gear 12 keyed to said shaft. In the center of the shaft loosely mounted thereon is the duplex bevel gear 13. Revolubly mounted in the upper part of said cylinder are two bevel gears 14 adapted to mesh on one side with the bevel gear 12 and on the other with the duplex gear 13. One of these bevel gears carries on the upper part thereof the steering column 15, upon which is mounted the usual steering wheels 16, the spur gear being keyed to the steering column. Immediately below and keyed to the gear shaft is the grooved cylinder 17. This cylinder has on the bottom side thereof a groove 18 which preferably extends from one end of the cylinder downwardly and partly around the cylinder, and extends from one end to the other end of the cylinder forming a cam for the reception and engagement of a boss 19 revolubly mounted on the rear end of the shifting arm 20. This arm is pivoted to the frame as at 21 and has in the forward end thereof a longitudinal slot 22 adapted to receive and engage a bolt 23 on the drag bar. This bolt is provided with an anti-friction lug 24 which has a sliding movement in the forward end of the shifting arm. Now it will be manifest that upon rotation of the steering wheel, movement will be imparted to the grooved drum 17 moving the shifting bar to the right or left and communicating motion to the drag link and thereby change the direction of the car when in motion.

In the gear cylinder we have provided two bevel gears 12, one keyed at either end of the gear shaft 11 and have disposed in the center thereof duplex gear 13 and have provided two bevel gears 14 for the purpose of imparting to each end of the gear shaft any strain placed thereon and to impart additional rigidity to the steering device when any unequal obstacles are encountered in the path of the moving car, to prevent the steering wheel from being thrown from the hands of the driver when either wheel encounters any obstruction in the road. The gear shaft 11 projects outwardly through the gear casing and carries on its outwardly projecting end 25 a spur gear 26 which meshes with a sector 27 on the lower end of the steering lever 28. This steering lever carries on its lower end the toothed sector 27 which in combination with the spur gear 26 keyed to the gear shaft constitutes a supplementary steering means which can be used in emergencies.

Having described our invention what we claim as new and desire to secure by Letters Patent is;—

1. The herein described means to steer an automobile, comprising in combination with the drag link of the automobile, a shifting bar pivotally mounted on the frame, one end of which is slidingly engaged to the drag link and carrying on the rear end thereof a boss revolubly mounted thereon adapted to enter into a groove in the periphery of a revoluble cylinder; a revoluble cylinder keyed to a gear shaft and having an annular groove therein, the said gear shaft being workably connected with the steering wheel.

2. In a device to steer an automobile, a gear shaft having keyed thereon and spaced apart a pair of miter gears; a duplex miter gear loosely mounted on said shaft in the center thereof; bevel gears disposed in bearings in said frame and adapted to mesh with the bevel gear on said shaft; a steering column mounted on one of the last mentioned bevel gears; a grooved cylinder keyed on said shaft in combination with a shifting bar, one end of which is adapted to enter into the groove in said cylinder and the other end workably connected with the drag link.

3. In a steering device of the character herein described having mounted therein a rotary shaft carrying operating gears; a cylinder keyed on said shaft and having in the periphery thereof an annular groove adapted to receive and engage a roller on the rear end of a centrally pivoted shifting bar; a shifting bar, the other end of the shifting bar carrying a sliding block pivotally connected with the drag link of the automobile, the said gear shaft being operatively connected with the steering wheel.

4. The herein described supplementary steering gear comprising in combination, a hand lever having on the top end thereof a handle and on the bottom end thereof a toothed sector pivoted in the frame of the automobile concentrically with the sector teeth thereon; a rotary shaft carrying on one end thereof a spur gear adapted to mesh with the sector on the lever, the said rotary shaft carrying thereon a grooved cylinder in combination with a shifting bar workably connected at its forward end with the drag link and the rear end adapted to enter the slot in the cylinder and be operated thereby.

5. In a steering device for an automobile, a shaft revolubly mounted on the under frame of the automobile having bevel gear connection with the steering post, a drum keyed to said shaft having in its surface a spiral groove, a shifting bar pivotally and centrally mounted on the frame, a roller on one end of said shifting bar engaging with the groove in said drum, a sliding block mounted on the other end of said shifting bar and pivotally secured to the drag link of the automobile.

In witness that we claim the foregoing we have hereunto subscribed our names this 2nd day of March, 1907.

THATCHER P. WILSON.
WALTER W. WILSON.

Witnesses:
GEO. W. LAZENBY,
EDMUND A. STRAUSE.